United States Patent
Gao et al.

(10) Patent No.: US 10,726,238 B2
(45) Date of Patent: Jul. 28, 2020

(54) DISPLAY PANEL AND DISPLAY DEVICE

(71) Applicant: Shanghai Tianma AM-OLED Co., Ltd., Shanghai (CN)

(72) Inventors: Yana Gao, Shanghai (CN); Xingyao Zhou, Shanghai (CN); Yuan Li, Shanghai (CN)

(73) Assignee: SHANGHAI TIANMA AM-OLED CO., LTD., Shanghai (CN)

( * ) Notice: Subject to any disclaimer, the term of this patent is extended or adjusted under 35 U.S.C. 154(b) by 98 days.

(21) Appl. No.: 16/137,575

(22) Filed: Sep. 21, 2018

(65) Prior Publication Data

US 2019/0370523 A1 Dec. 5, 2019

(30) Foreign Application Priority Data

Jun. 5, 2018 (CN) .......................... 2018 1 0569503

(51) Int. Cl.
  *G09G 3/36* (2006.01)
  *G06K 9/00* (2006.01)
  *G09G 3/3266* (2016.01)

(52) U.S. Cl.
  CPC .......... *G06K 9/0004* (2013.01); *G09G 3/3266* (2013.01); *G09G 2310/08* (2013.01)

(58) Field of Classification Search
  CPC .. G09G 3/3674; G09G 3/3677; G09G 3/3266; G09G 2310/0267; G09G 2310/08; G09G 3/044; G09G 3/0416
  See application file for complete search history.

(56) References Cited

U.S. PATENT DOCUMENTS 9,478,166 B2 10/2016 Pyo et al.
2018/0349667 A1* 12/2018 Kim ...................... G06F 3/0416

FOREIGN PATENT DOCUMENTS

CN 107819011 A 3/2018

OTHER PUBLICATIONS

Chinese Office Action dated Apr. 16, 2020 for corresponding CN Application No. 201810569503.9, and English translation thereof.

* cited by examiner

*Primary Examiner* — Dennis P Joseph
(74) *Attorney, Agent, or Firm* — Tarolli, Sundheim, Covell & Tummino LLP

(57) ABSTRACT

The present disclosure provides a display panel and a display device. The display panel includes: a plurality of light-emitting devices; a plurality of fingerprint recognition sensors; a plurality of pixel driving circuits each corresponding to one of the plurality of light-emitting devices; and a light-emitting scan driving circuit for controlling whether or not the plurality of light-emitting devices emit light. The light-emitting scan driving circuit is used to output a first pulse signal to a corresponding pixel driving circuit during a fingerprint recognition time phase, and to output a second pulse signal to a corresponding pixel driving circuit during a non-fingerprint recognition time phase. A period of the first pulse signal is different from a period of the second pulse signal.

14 Claims, 7 Drawing Sheets

DISPLAY PANEL AND DISPLAY DEVICE

CROSS-REFERENCE TO RELATED APPLICATIONS

The present disclosure claims priority to Chinese Patent Application No. 201810569503.9, filed on Jun. 5, 2018, the content of which is incorporated herein by reference in its entirety.

TECHNICAL FIELD

The present disclosure relates to the field of display technologies, and in particular, to a display panel and a display device.

BACKGROUND

For an organic light-emitting diode (Organic Light-Emitting Diode, OLED) display panel, in order to improve the service lifetime of the light-emitting device, a dimming mode is used to control the light-emitting state of the light-emitting device. In the dimming mode, the light-emitting device periodically stops emitting light in each frame. However, for the OLED display panel with a fingerprint recognition function, the fingerprint recognition is achieved by light emitted from the light-emitting device being reflected by the finger and then being received by the fingerprint recognition sensor. That is, the light-emitting device is used to achieve a display function and reused as a light source for fingerprint recognition. Therefore, in the dimming mode, since the light-emitting device does not emit light for a long time, this may cause an adverse effect on fingerprint recognition.

SUMMARY

The present disclosure provides a display panel and a display device, satisfying the requirements on the light-emitting device for both the display function and the fingerprint recognition function, thereby improving the fingerprint recognition effect.

In one aspect, the present disclosure provides a display panel, including: a plurality of light-emitting devices; a plurality of fingerprint recognition sensors; a plurality of pixel driving circuits each corresponding to one of the plurality of light-emitting devices; and a light-emitting scan driving circuit that controls whether or not the plurality of light-emitting devices emit light. The light-emitting scan driving circuit outputs a first pulse signal to one or more of the plurality of pixel driving circuits during a fingerprint recognition time phase, and outputs a second pulse signal to one or more of the plurality of pixel driving circuits during a non-fingerprint recognition time phase. A period of the first pulse signal is different from a period of the second pulse signal.

In another aspect, the present disclosure provides a display device including the abovementioned display panel.

BRIEF DESCRIPTION OF DRAWINGS

In order to more clearly illustrate technical solutions in embodiments of the present disclosure, the accompanying drawings used in the embodiments are briefly introduced as follows. The drawings described as follows are merely part of the embodiments of the present disclosure, other drawings can also be acquired by those skilled in the art without paying creative efforts.

DESCRIPTION OF EMBODIMENTS

In order to make the purpose, technical solutions, and advantages of the embodiments of the present disclosure to be clearer, the technical solutions in the embodiments of the present disclosure are clearly and completely described in the following with reference to the accompanying drawings in the embodiments of the present disclosure. The described embodiments are merely exemplary embodiments of the present disclosure, which shall not be interpreted as limiting the present disclosure. All other embodiments obtained by those skilled in the art without creative efforts according to the embodiments of the present disclosure are within the scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

Figure 1:
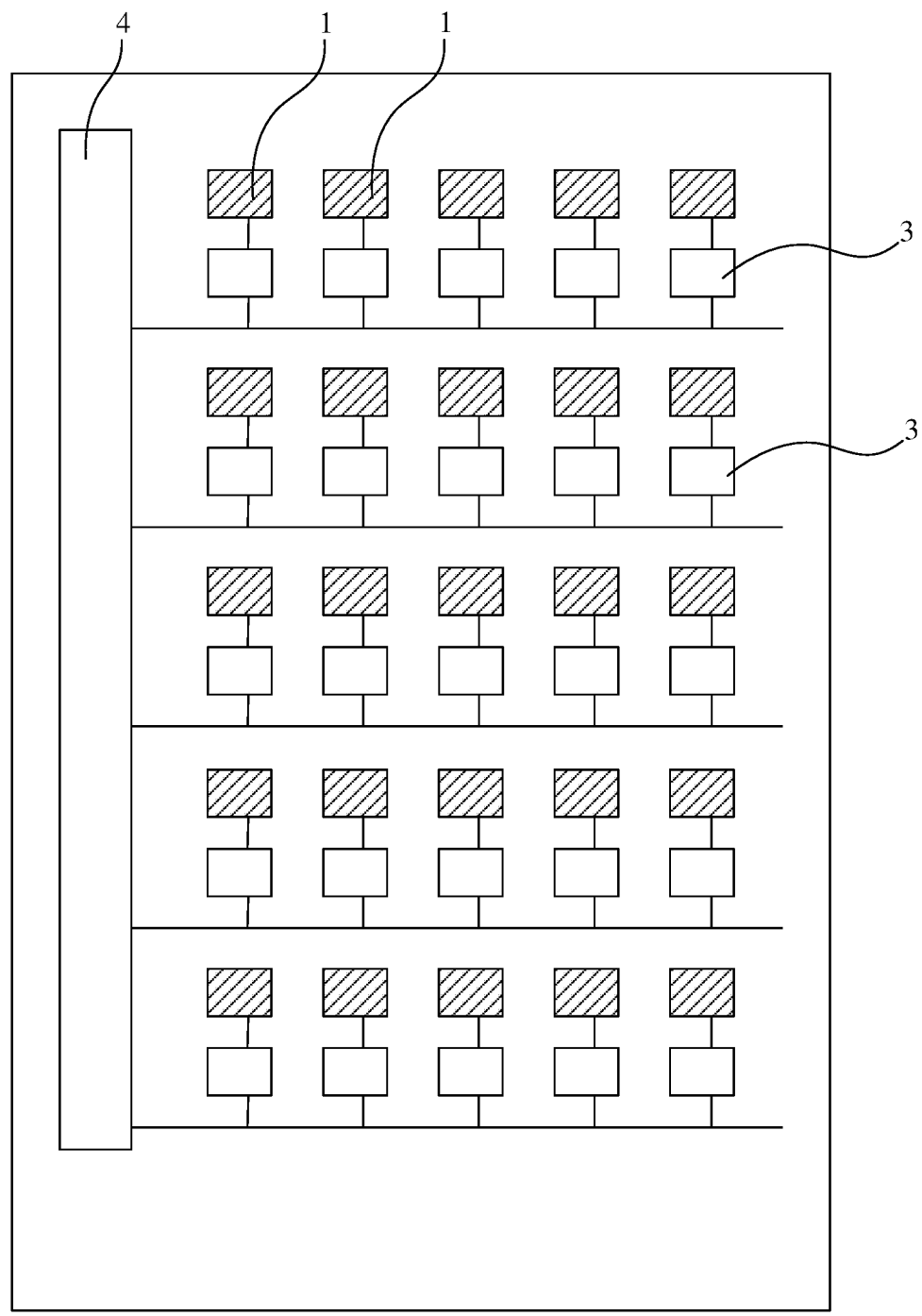
FIG. 1 is a schematic structural diagram of a display panel according to an embodiment of the present disclosure.
Figure 2:
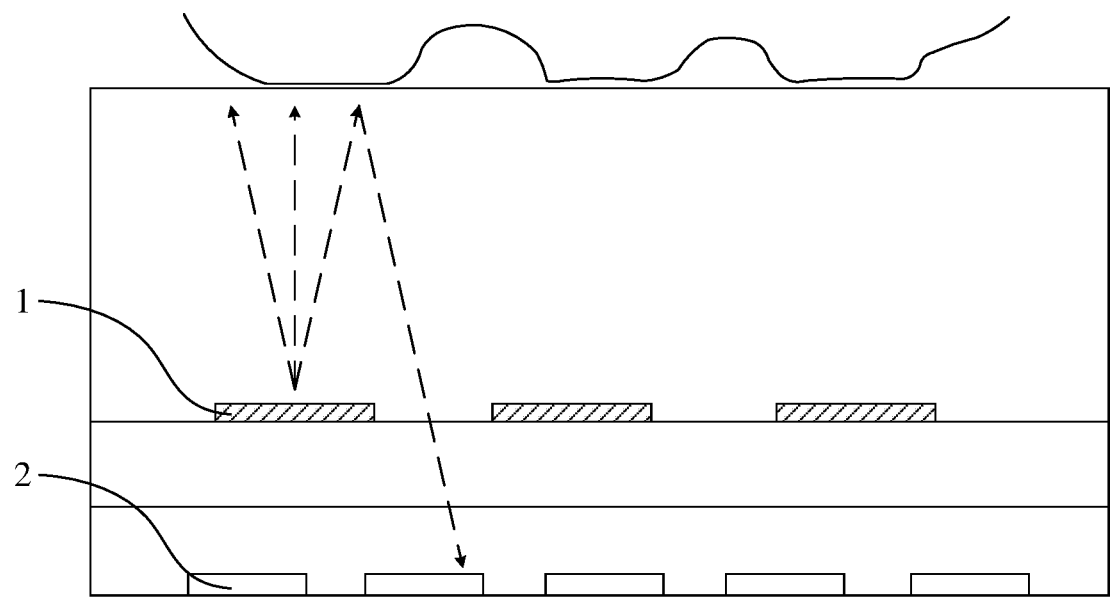
FIG. 2 is a schematic diagram of a cross-sectional structure status of a partial region of the display panel in FIG. 1 during fingerprint recognition.
Figure 3:
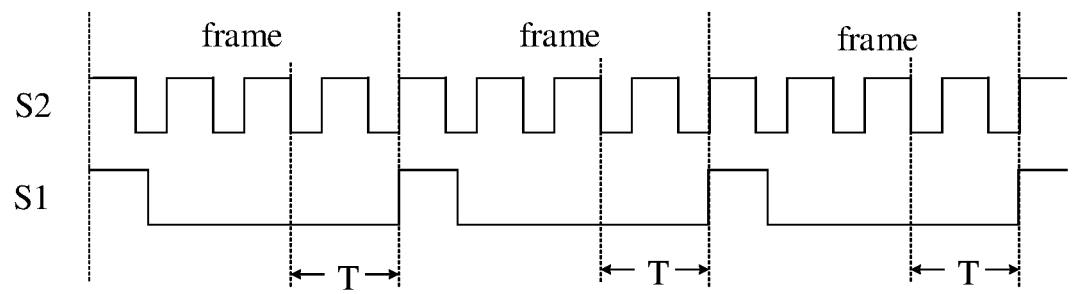
FIG. 3 is a timing sequence diagram of different pulse signals outputted by a light-emitting scan driving circuit in FIG. 1.

As shown in FIGS. 1-3, FIG. 1 is a schematic structural diagram of a display panel according to an embodiment of the present disclosure; FIG. 2 is a schematic diagram of a cross-sectional structure status of a partial region of the display panel in FIG. 1 during fingerprint recognition; and FIG. 3 is a timing sequence diagram of different pulse signals outputted by a light-emitting scan driving circuit in FIG. 1. An embodiment of the present disclosure provides a display panel, including: a plurality of light-emitting devices 1, a plurality of fingerprint recognition sensors 2 (not shown in FIG. 1), a plurality of pixel driving circuits 3 corresponding to the plurality of light-emitting devices 1; a light-emitting scan driving circuit 4 for controlling whether or not the plurality of light-emitting devices 1 emits light. The light-emitting scan driving circuit 4 is configured to output a first pulse signal S1 to the corresponding pixel driving circuit 3 during the fingerprint recognition time phase, and output a second pulse signal S2 to the corresponding pixel driving circuit 3 during the non-fingerprint recognition time phase. The cycle of the first pulse signal S1 is different from the cycle of the second pulse signal S2.

Figure 4:
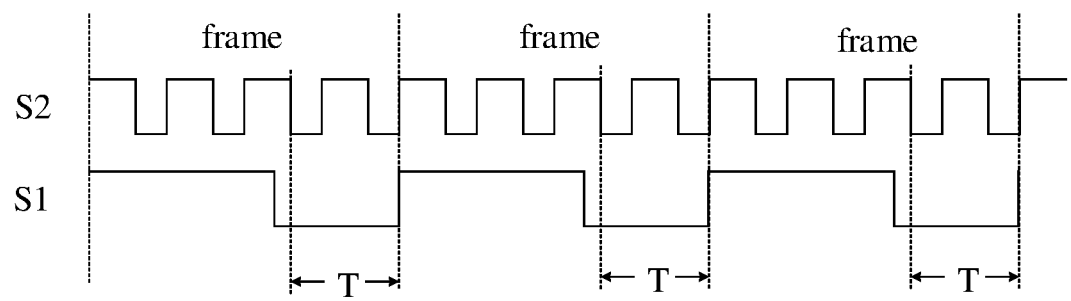
FIG. 4 is another timing sequence diagram of different pulse signals outputted by a light-emitting scan driving circuit in FIG. 1.
Figure 5:
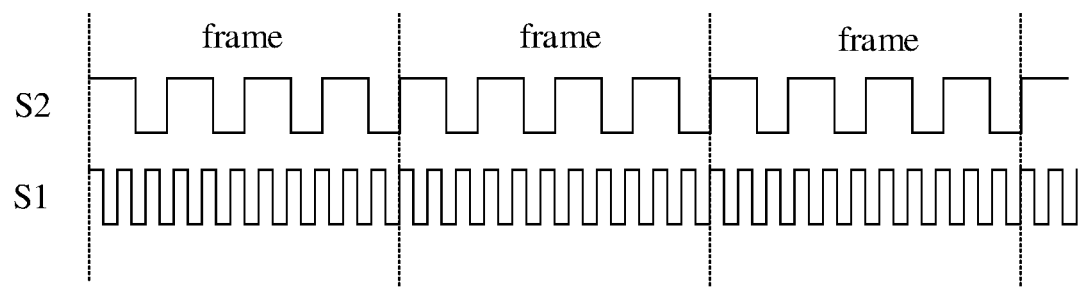
FIG. 5 is still another timing sequence diagram of different pulse signals outputted by a light-emitting scan driving circuit in FIG. 1.

FIG. 1 is merely used to illustrate connection relationships among the light-emitting device 1, the fingerprint recognition sensor 2, and the pixel driving circuit 3, and the actual position of each component is not limited herein. Generally, the display panel includes a plurality of sub-pixels, and each sub-pixel corresponds to a respective one light-emitting device 1. The light-emitting device 1 is used to realize a corresponding color display of the sub-pixel. Each sub-pixel further corresponds to a respective one pixel driving circuit 3, and the pixel driving circuit 3 is connected to a corresponding light-emitting device 1 and used to drive the light-emitting device 1, including a function for controlling whether the light-emitting device 1 emits light or not. The light-emitting scan driving circuit 4 is connected to a corresponding pixel driving circuit 3 and used to generate a light-emitting driving signal and output it to the pixel driving circuit 3. The pixel driving circuit 3 controls the corresponding light-emitting device 1 to emit light or not according to the light-emitting driving signal generated by the light-emitting scan driving circuit 4. The light-emitting driving signal includes the above-mentioned first pulse signal S1 and second pulse signal S2. FIG. 2 is merely used to illustrate how the light-emitting device 1 and the fingerprint recognition sensor 2 cooperatively perform fingerprint recognition, and does not limit the positional relationship between the light-emitting device 1 and the fingerprint recognition sensor 2. For example, in other embodiments, the light-emitting device and the fingerprint recognition sensor can be arranged in a same layer. In the fingerprint recognition time phase, the light-emitting device 1 is used to perform the display function and is reused as a light source for fingerprint recognition. Light emitted from the light-emitting device 1 reaches a surface of the display panel, and when a finger is positioned on the surface of the display panel, the light emitted from the light-emitting device 1 will be reflected by the finger and then reach the fingerprint recognition sensor 2. The fingerprint recognition sensor 2 acquires a fingerprint signal corresponding to the light reflected by the finger, and transmits it to a driving chip (not shown in the figure), and then the driving chip performs fingerprint recognition according to the acquired fingerprint signal. In the non-fingerprint recognition time phase, the light-emitting device 1 is only used for realizing the display function. Therefore, the second pulse signal S2 outputted from the light-emitting scan driving circuit 4 is only used to satisfy the display requirement, for example, a dimming mode is used to control a light-emitting state of the light-emitting device 1, so that the light-emitting device 1 will periodically stop emitting light in each frame. In the fingerprint recognition time phase, the light emitted from the light-emitting device 1 is required for fingerprint recognition. Therefore, the first pulse signal S1 outputted from the light-emitting scan driving circuit 4 needs to satisfy the requirement of fingerprint recognition. On the one hand, for example, the light-emitting period of the light-emitting device 1 is shortened, so that a time for the light-emitting device 1 to continuously emit light is extended, thereby improving the fingerprint recognition effect. As shown in FIG. 3 and FIG. 4, which is another timing sequence diagram of different pulse signals outputted by the light-emitting scan driving circuit in FIG. 1, in each frame, an effective time period T is a time during which the fingerprint recognition sensor 2 actually performs fingerprint recognition and transmits a fingerprint signal to the driving chip. The light-emitting period of the light-emitting device 1 is shortened so that the time for the light-emitting device 1 to continuously emit light is extended, and thus the effective time period T is within the time during which the light-emitting device 1 continuously emits light, or the time during which the light-emitting device 1 continuously emits light is extended during the effective time period T. As a result, in the dimming mode, within the effective time period T, a time during which the light-emitting device 1 does not emit light is short or does not exist, thereby improving the fingerprint recognition effect. On the other hand, for example, the light-emitting period of the light-emitting device 1 is extended, so that the time during which the light-emitting device 1 does not emit light is short, and during this short time for not emitting light, the adverse influence on the fingerprint recognition effect is small, thereby improving the fingerprint recognition effect. As shown in FIG. 5, FIG. 5 is still another timing sequence diagram of different pulse signals outputted by the light-emitting scan driving circuit in FIG. 1. The light-emitting period of the light-emitting device 1 is extended so that the light-emitting device 1 emits light for more times. However, a non-light-emitting time between two adjacent light-emitting time periods is shorter. When the frequency of the light-emitting device 1 not emitting light increases to a certain degree, there is no continuous dark state, and even if there is a time during which light is not emitted, the fingerprint recognition sensor 2 can still perform fingerprint recognition, thereby improving the fingerprint recognition effect. It should be noted that different levels of a pulse signal in FIG. 3 correspond to two states of the light-emitting device 1, namely, a light-emitting state and a non-light-emitting state. For example, an enabling level (e.g., a high level) corresponds to the light-emitting state of the light-emitting device 1, and a non-enabling level (e.g., a low level) corresponds to the non-light-emitting state of the light-emitting device 1.

For the display panel in an embodiment of the present disclosure, the light-emitting scan driving circuit outputs the first pulse signal to the corresponding pixel driving circuit during the fingerprint recognition time phase, and the first pulse signal is used to control the light-emitting of the light-emitting device to adapt to the fingerprint recognition function. The light-emitting scan driving circuit outputs the second pulse signal to the corresponding pixel driving circuit during the non-fingerprint recognition time phase. The period of the first pulse signal is different from the period of the second pulse signal. The second pulse signal is used to control the light-emitting of the light-emitting device to adapt to the display function, so as to be compatible with the requirements on the light-emitting device from both the display function and the fingerprint recognition function, thereby improving the fingerprint recognition effect.

In an embodiment, the display panel further includes: a light-emitting control module (not shown in the figures). The light-emitting control module is connected to the light-emitting scan driving circuit 4, and the light-emitting control module is also connected to a fingerprint recognition signal terminal (not shown in the figures). The light-emitting control module controls the light-emitting scan driving circuit 4 to output the first pulse signal S1 in response to the fingerprint recognition signal from the fingerprint recognition signal terminal. The light-emitting control module is further used to control the light-emitting scan driving circuit 4 to output the second pulse signal S2 in response to the non-fingerprint recognition signal from the fingerprint recognition signal terminal.

The light-emitting control module may be either an independent module or a driving chip in the display panel. The fingerprint recognition signal terminal is used to output a fingerprint recognition signal, and the fingerprint recognition signal is used to indicate whether the display panel is in the fingerprint recognition time phase or the non-fingerprint recognition time phase. The generation manner and the form of the fingerprint recognition signal will not be limited herein. For example, the fingerprint recognition signal can be a periodic signal. In an example, in the display process, it is the fingerprint recognition time phase after each fixed non-fingerprint recognition time phase, so as to achieve fingerprint recognition in the display process. Alternatively, the fingerprint recognition signal can be a controllable signal. For example, in the display process, the non-fingerprint recognition time phase is default, and it will be switched to the fingerprint recognition time phase in a scenario of fingerprint recognition. For example, for a mobile phone including the above-mentioned display panel, in a case of confirming the user identity, such as unlocking, payment, or viewing privacy information, the mobile phone will be switched to the fingerprint recognition time phase.

In an embodiment, as shown in FIG. 3, in each frame, the time period corresponding to the second pulse signal S2 includes multiple periods of a pulse. During one frame including the fingerprint recognition time phase, the time period corresponding to the first signal S1 includes at least one period of a pulse, and the number of the multiple periods of a pulse is larger than the number of the at least one period of a pulse. As shown in FIG. 3, during one frame including the fingerprint recognition time phase, the time period corresponding to the first pulse signal S1 may include one period of a pulse.

In the non-fingerprint recognition time phase, the light-emitting device 1 is only used for achieving the display function. Therefore, the second pulse signal S2 outputted from the light-emitting scan driving circuit 4 is only used to satisfy the display requirement. For example, a dimming mode is used to control a light-emitting state of the light-emitting device 1, so that the light-emitting device 1 will periodically stop emitting light in each frame. In the fingerprint recognition time phase, the light emitted from the light-emitting device 1 is required for fingerprint recognition. Therefore, the first pulse signal S1 outputted from the light-emitting scan driving circuit 4 needs to satisfy the requirement of fingerprint recognition. During one frame, the light-emitting device 1 needs at least one non-light-emitting time period, so as to achieve that a process in which data is written into the pixel driving circuit 3 does not bring a bad influence on the display. Therefore, during one frame including the fingerprint recognition time phase, the time period corresponding to the first pulse signal S1 can include one period of a pulse, and this pulse includes a non-enabling level (e.g., a high level) to cause the light-emitting device 1 not to emit light in the duration of the non-enabling level. This pulse can further include an enabling level (e.g., a low level) to cause the light-emitting device 1 to emit light in the duration of the enabling level. During one frame, compared with the second pulse signal S2, the first pulse signal S1 includes only one enabling level. Therefore, the duration of the enabling level can be longer, and the fingerprint recognition can be performed during a longer time during which the light-emitting device 1 continuously emits light, thereby improving the fingerprint recognition effect.

In an embodiment, as shown in FIG. 4, a duty cycle of the enabling level in the first pulse signal S1 is equal to a duty cycle of the enabling level in the second pulse signal S2.

The duty cycle of the enabling level in the first pulse signal S1 is close to or even equal to the duty cycle of the enabling level in the second pulse signal S2, so that during the entire display process, the light-emitting device 1 in each frame can have a small difference in light-emitting brightness, thereby reducing the display difference due to the difference between the first pulse signal S1 and the second pulse signal S2 when switching between the fingerprint recognition time phase and the non-fingerprint recognition time phase.

For example, the duty cycle of the enabling level in the second pulse signal S2 is a %, the duty cycle of the enabling level in the first pulse signal S1 is b %, and a %<b %<100%.

In each frame, the duration of the non-enabling level in the pulse signal cannot be extremely long. If the duty cycle of the enabling level in the first pulse signal S1 is set to be equal to the duty cycle of the enabling level in the second pulse signal S2 so as to make the brightness of the light-emitting device 1 in the fingerprint recognition time phase close to the brightness of the light-emitting device 1 in the non-fingerprint recognition time phase, the duration of the non-enabling level continuous in the first pulse signal S1 will be extremely long. Therefore, the duty cycle of the enabling level in the first pulse signal S1 can be set to be greater than the duty cycle of enabling level in the second pulse signal S2. Then, the brightness of the light-emitting device 1 in the fingerprint recognition time phase can be enhanced in other ways to reduce the display difference when switching between the fingerprint recognition time phase and the non-fingerprint recognition time phase, meanwhile resulting in the short duration of the non-enabling level continuous in the first pulse signal S1.

In an embodiment, the display panel further includes: a driving chip (not shown) connected to each fingerprint recognition sensor 2. The driving chip is configured to read a fingerprint signal of the fingerprint recognition sensor 2, and a time during which the driving chip reads the fingerprint signal of each fingerprint recognition sensor 2 is within the duration of the enabling level in the second pulse signal S2.

The light-emitting device 1 does not emit light within the duration of the non-enabling level in the second pulse signal S2. As a result, the read fingerprint signal may not be accurate if the fingerprint signal is read during this time period. Therefore, for further improving the fingerprint recognition accuracy, the driving chip can be controlled to read the fingerprint signal within the duration of the enabling level in the second pulse signal S2, even if the effective time period T is within the time during which the light-emitting device 1 continuously emits light.

In an embodiment, as shown in FIG. 5, the period of the first pulse signal S1 is shorter than the period of the second pulse signal S2.

In the non-fingerprint recognition time phase, the light-emitting device 1 is only used for achieving the display function. Therefore, the second pulse signal S2 outputted from the light-emitting scan driving circuit 4 is only used to satisfy the display requirement. For example, a dimming mode is used to control a light-emitting state of the light-emitting device 1, so that the light-emitting device 1 will periodically stop emitting light in each frame and it will stop emitting light for a long time. In the fingerprint recognition time phase, the light emitted from the light-emitting device 1 is required for fingerprint recognition. Therefore, the first pulse signal S1 outputted from the light-emitting scan driving circuit 4 needs to satisfy the requirement of fingerprint recognition. When the light-emitting period of the light-emitting device 1 is short, the frequency at which the light-emitting device 1 does not emit light increases while a time during which the light-emitting device 1 continuously to not emit light becomes short. When the frequency at which the light-emitting device 1 does not emit light increases to a certain degree, there is no continuous dark state. Even if there is a time for not emitting light, the fingerprint recognition sensor 2 can still perform fingerprint recognition, and thus the fingerprint recognition effect can be improved. It should be noted that in the timing sequence shown in FIG. 5, there is no continuous long-time light-emitting time period in each frame, and therefore, the time for the driving chip reading the fingerprint signal of the fingerprint recognition sensor 2 is not limited herein.

Figure 6:
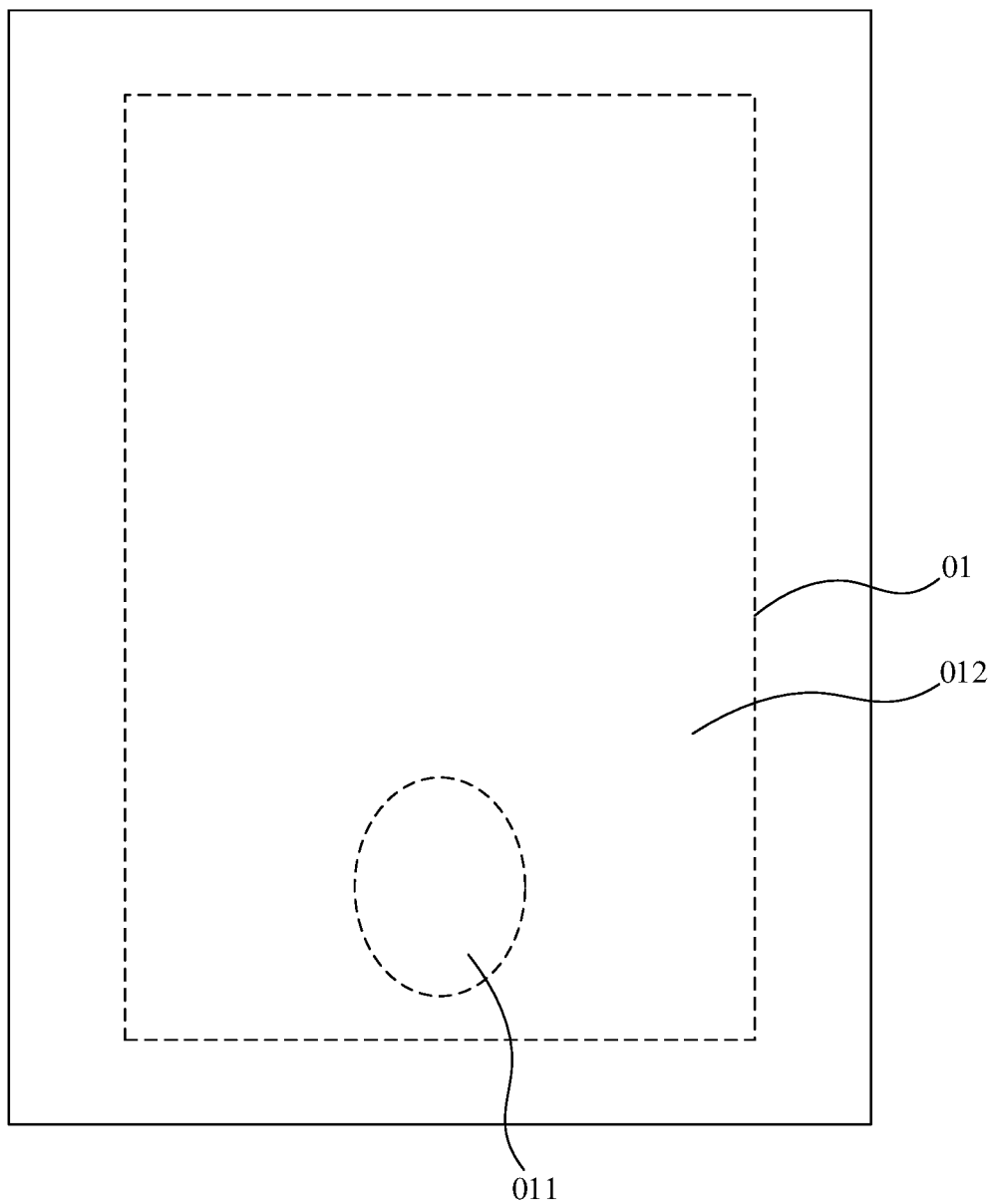
FIG. 6 is another schematic view of the display panel in FIG. 1.

In an embodiment, as shown in FIG. 6, which is another schematic view of the display panel in FIG. 1, the display panel includes a display area 01, and the display area 01 includes a fingerprint recognition region 011 and a non-fingerprint recognition region 012. A plurality of fingerprint recognition sensors is located within the fingerprint recognition region 011. The duration of each non-enabling level in the first pulse signal S1 is shorter than a scan time for the fingerprint recognition region 011.

In the structure shown in FIG. 6, the display panel includes a fixed fingerprint recognition region 011. The fingerprint recognition region 011 corresponds to multiple rows of light-emitting devices 1. The light-emitting scan driving circuit 4 sequentially drives pixel driving circuits 3 corresponding to each row of light-emitting devices 1 by means of scanning, and pixel driving circuits 3 corresponding to each row of light-emitting devices 1 receives a first pulse signal S1 having a same phase. When pixel driving circuits 3 corresponding to different rows of light-emitting devices 1 acquire first pulse signals S1 having different phases, for multiple adjacent rows of light-emitting devices 1, non-enabling levels in first pulse signals S1 of pixel driving circuits 3 corresponding to different rows of light-emitting devices 1 can have an overlapping time period, and during the overlapping time period, these rows of light-emitting devices 1 do not emit light. If all light-emitting devices 1 within the entire fingerprint recognition region 011 do not emit light at the same time, the fingerprint recognition sensor 2 cannot perform the normal fingerprint recognition. Therefore, the duration of each non-enabling level in the first pulse signal S1 is shorter than the scan time for the fingerprint recognition region 011. That is, the non-enabling level in the first pulse signal S1 corresponding to at least one row of light-emitting devices 1 within the fingerprint recognition region 011 does not overlap with the non-enabling level in the first pulse signal S1 corresponding to other row(s) of light-emitting devices 1 within the fingerprint recognition region 011. Thus, at any time, at least one row of light-emitting devices 1 within the fingerprint recognition region 011 emit light, thereby providing the light source for fingerprint recognition.

It should be noted that the display panel includes a fixed fingerprint recognition region by way of an example in an embodiment of the present disclosure. The present disclosure does not limit the specific form of the fingerprint recognition region. In other embodiments, for example, the entire display area can be a fingerprint recognition region, and in this way, the user can perform fingerprint recognition by touching anywhere within the display area using a finger.

Figure 7:
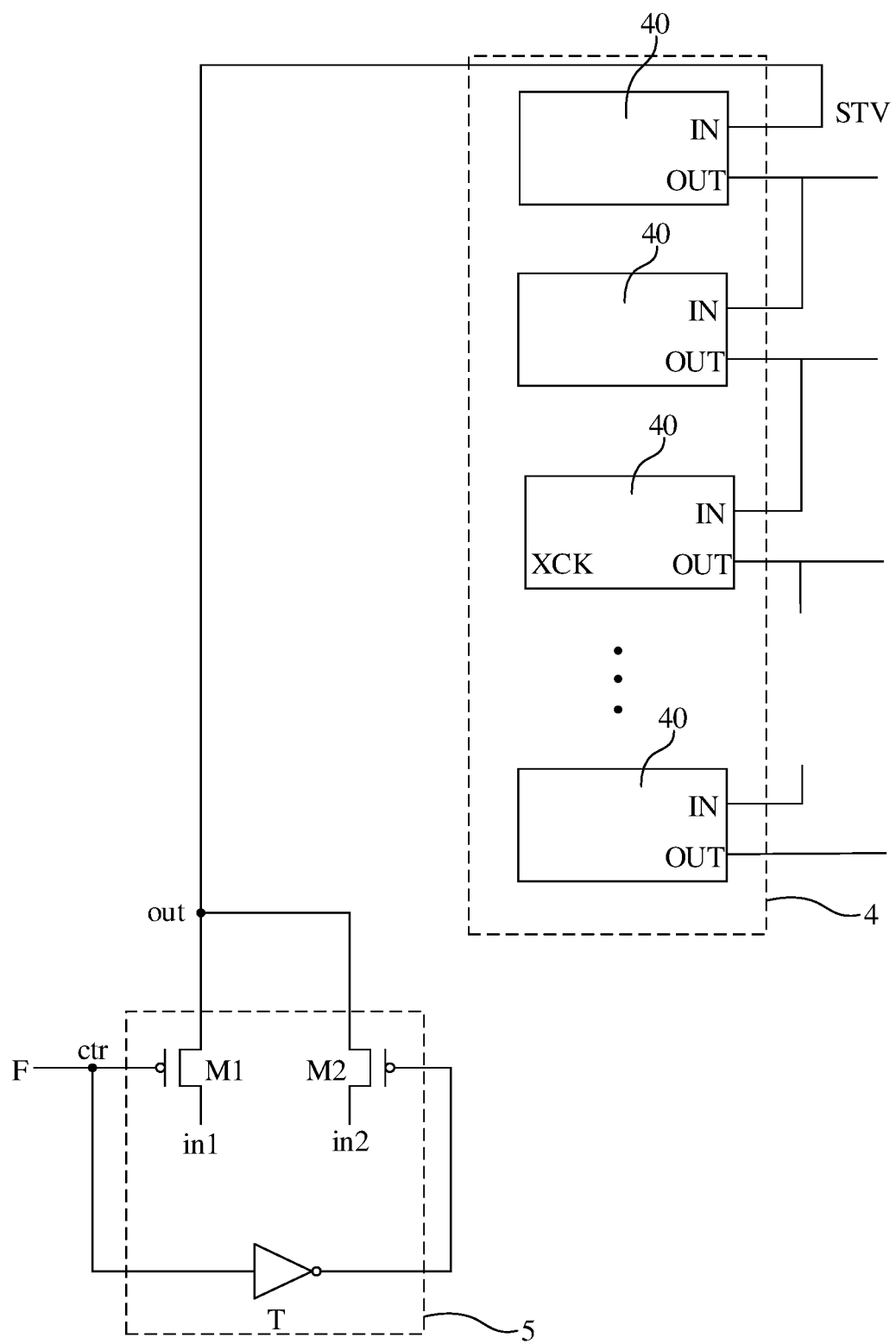
FIG. 7 is a schematic diagram of a connection between a light-emitting scan driving circuit and a light-emitting control module according to an embodiment of the present disclosure.

As shown in FIG. 7, which is a schematic diagram of a connection between a light-emitting scan driving circuit and a light-emitting control module according to an embodiment of the present disclosure, the display panel includes a first pulse signal terminal (not shown) for outputting a first pulse signal S1 and a second pulse signal terminal (not shown) for outputting a second pulse signal S2. The light-emitting control module 5 includes a first input terminal in1, a second input terminal in2, an output terminal out and a strobe control terminal ctr. The first input terminal in1 is connected to the first pulse signal terminal, the second input terminal in2 is connected to the second pulse signal terminal, the output terminal out is connected to an initial signal terminal STV of the light-emitting scan driving circuit 4, and the strobe control terminal ctr is connected to a fingerprint recognition signal terminal F. The light-emitting control module 5 is configured to connect the first input terminal in1 with the output terminal out in response to the fingerprint recognition signal of the fingerprint recognition signal terminal F, and to connect the second input terminal in2 with the output terminal out in response to the non-fingerprint recognition signal of the fingerprint recognition signal terminal F.

The fingerprint recognition signal of the fingerprint recognition signal terminal F is used to indicate whether the display panel is in the fingerprint recognition time phase or in the non-fingerprint recognition time phase. When the fingerprint recognition signal terminal F outputs a non-fingerprint recognition signal (e.g., a high-level), it indicates that the display panel is in the non-fingerprint recognition time phase. At this time, the second input terminal in2 is connected with the output terminal out, so that the second pulse signal S2 is transmitted to the initial signal terminal STV of the light-emitting scan driving circuit 4. When the fingerprint recognition signal terminal F outputs a fingerprint recognition signal (e.g., a low level), it indicates that the display panel is in the fingerprint recognition time phase. At this time, the first input terminal in1 is connected with the output terminal out, so that the first pulse signal S1 is transmitted to the initial signal terminal STV of the light-emitting scan driving circuit 4. With the light-emitting control module 5, the signal received by the initial signal terminal STV can be switched between the first pulse signal S1 and the second pulse signal S2.

In an embodiment, the light-emitting control module 5 includes: a first thin film transistor M1 having a first terminal connected to the output terminal out and a second terminal connected to the first input terminal M1; a second thin film transistor M2 having a first terminal connected to the output terminal out and a second terminal connected to the second input terminal in2; and an inverter T having a first terminal connected to a control terminal of the first thin film transistor M1 and a second terminal connected to a control terminal of the second thin film transistor M2. The strobe control terminal ctr is connected to the first terminal or the second terminal of the inverter T. The first thin film transistor M1 and the second thin film transistor M2 are of the same control type.

In an example, the first thin film transistor M1 and the second thin film transistor M2 are both P-type thin film transistors. Taking the strobe control terminal ctr being connected to the first terminal of the inverter T as an example, when the fingerprint recognition signal terminal F outputs the non-fingerprint recognition signal (e.g., a high level), the high-level voltage controls the first thin film transistor M1 to be switched off, and at the same time, the high-level voltage passes through the inverter T and then becomes a low-level voltage to control the second thin film transistor M2 to be switched on. At this time, the second input terminal in2 is connected with the output terminal out, so that the second pulse signal S2 is transmitted to the initial signal terminal of the light-emitting scan driving circuit 4. When the fingerprint recognition signal terminal F outputs the fingerprint recognition signal (e.g., a low level), the low-level voltage controls the first thin film transistor M1 to be switched on, and at the same time, the low-level voltage passes through the inverter T and then becomes a high-level voltage to control the second thin film transistor M2 to be switched off. At this time, the first input terminal in1 is connected with the output terminal out to transmit the first pulse signal S1 to the initial signal terminal STV of the light-emitting scan driving circuit 4.

In an example, the fingerprint recognition sensor 2 is an optical fingerprint recognition sensor, which is used to receive light emitted from the light-emitting device 1.

The optical fingerprint recognition sensor achieves the fingerprint recognition function by receiving the light emitted from the light-emitting device 1, and thus, it is not necessary to additionally provide a separate light source for fingerprint recognition.

In an example, the light-emitting devices 1 are organic light-emitting devices.

The display panel in an embodiment of the present disclosure will be described in the following with a specific pixel driving circuit structure.

Figure 8:
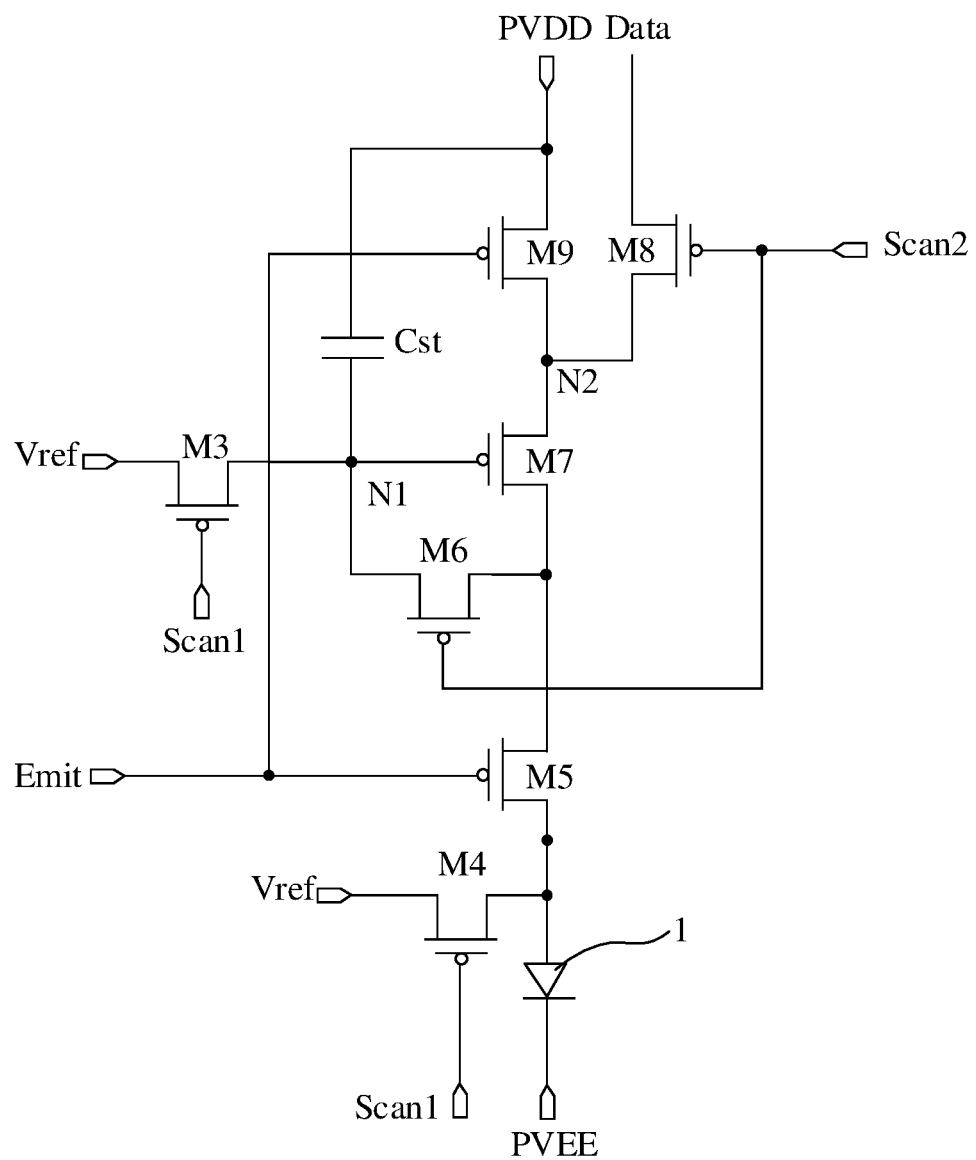
FIG. 8 is a schematic structural diagram of a pixel driving circuit according to an embodiment of the present disclosure.
Figure 9:
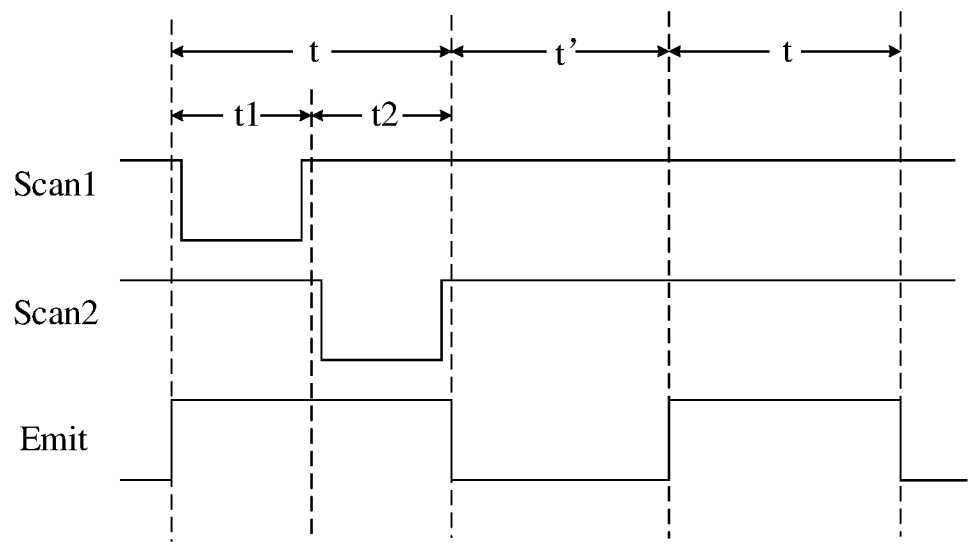
FIG. 9 is a timing sequence diagram of signal terminals in FIG. 8.

As shown in FIG. 8 and FIG. 9, FIG. 8 is a schematic structural diagram of a pixel driving circuit according to an embodiment of the present disclosure, and FIG. 9 is a timing sequence diagram of signal terminals in FIG. 8. The pixel driving circuit includes a third thin film transistor M3 and a fourth thin film transistor M4. The third thin film transistor M3 includes a control terminal electrically connected to the first control signal terminal Scan1, a first terminal electrically connected to the reset signal terminal Vref, and a second terminal electrically connected to the first node N1. The fourth thin film transistor M4 includes a control terminal electrically connected to the first control signal terminal Scan1, a first terminal electrically connected to the reset signal terminal Vref, and a second terminal electrically connected to the anode of the light-emitting device 1. The pixel driving circuit further includes a fifth thin film transistor M5 to a ninth thin film transistor M9, and a storage capacitor Cst. The fifth thin film transistor M5 includes a control terminal electrically connected to the light-emitting control signal terminal Emit, a first terminal electrically connected to a second terminal of the sixth thin film transistor M6, and a second terminal electrically connected to the anode of the light-emitting device. The sixth thin film transistor M6 includes a control terminal electrically connected to the second control signal terminal S2 and a first terminal electrically connected to the first node N1. The seventh thin film transistor M7 includes a control terminal electrically connected to the first node N1, a first terminal electrically connected to a second terminal of the ninth thin film transistor M9, and a second terminal electrically connected to the first terminal of the fifth thin film transistor M5. The eighth thin film transistor M8 includes a control terminal electrically connected to the second control signal terminal S2, a first terminal electrically connected to the data line Data, and a second terminal electrically connected to the first terminal of the seventh thin film transistor M7. The ninth thin film transistor M9 includes a control terminal electrically connected to the light-emitting control signal terminal Emit and a first terminal electrically connected to the power signal terminal PVDD. The storage capacitor Cs includes a first terminal plate electrically connected to the power signal terminal PVDD, and a second terminal plate electrically connected to the first node N1.

The operating mode of the display panel includes a non-fingerprint recognition time phase and a fingerprint recognition time phase. Within the non-fingerprint recognition time phase and the fingerprint recognition time phase, the driving period of the display panel includes a reset time period and a light-emitting control time period. The light-emitting control time period includes a data signal writing time period and a light-emitting time period.

In each frame, each pixel driving circuit includes a non-light-emitting time period t and a light-emitting time period t'. The non-light-emitting time period t corresponds to a time period of the non-enabling level in the first pulse signal S1 and the second pulse signal S2. The light-emitting time period t' corresponds to a time period of the enabling level in the first pulse signal S1 and the second pulse signal S2. The first non-light-emitting time period t in the first pulse signal S1 and the second pulse signal S2 includes a reset time period t1 and a data signal writing time period t2. In other time periods than the first non-light-emitting time period t, there is no reset and data signal writing process, that is, there is only one reset and data writing process per frame.

In the reset time period t1, the first control signal terminal Scan1 outputs an enabling level (a low level), the second control signal terminal Scan2 outputs a non-enabling level (a high level), and the light-emitting control signal terminal emits a non-enabling level (a high level). The third thin film transistor M3 and the fourth thin film transistor M4 are switched on under the action of the low-level. The first node N1 and the anode of and the light-emitting device 1 are reset by the signal outputted from the reset signal terminal Vref. The fifth thin film transistor M5 and the ninth thin film transistor M9 are switched off under the action of the high-level outputted from the light-emitting control signal terminal Emit. In this way, the power signal terminal PVDD is disconnected from the anode of the light-emitting device 1, and thus the light-emitting device 1 is controlled not to emit light.

In the data signal writing time period t2, the first control signal terminal Scan1 outputs a non-enabling level (a high level), the second control signal terminal Scan2 outputs an enabling level (a low level), and the light-emitting control signal terminal Emit outputs a non-enabling level (a high level). The seventh thin film transistor M7 is switched on under the action of the low-level at the first node N1. The eighth thin film transistor M8 and the sixth thin film transistor M6 are switched on under the action of the low-level outputted from the second control signal terminal Scan2. The data signal in the data line Data is written to the second node N2, and the second node N2 is connected with the first node N1 through the seventh thin film transistor M7 and the sixth thin film transistor M6 until the voltage at the first node N1 reaches Vdata−|Vth|, where Vdata is a data signal voltage in the data line Data and Vth is a threshold voltage of the seventh thin film transistor M7. The seventh thin film transistor M7 is switched off, so that the threshold value of the seventh thin film transistor M7 can be grabbed. The fifth thin film transistor M5 and the ninth thin film transistor M9 are switched off under the action of the high-level outputted from the light-emitting control signal terminal Emit, so that the power signal terminal PVDD is disconnected from the anode of the light-emitting device 1, thereby controlling the light-emitting device 1 not to emit light.

In the light-emitting time period t', the first control signal terminal Scan1 outputs a non-enabling level (a high level), the second control signal terminal Scan2 outputs a non-enabling level (a high level), and the light-emitting control signal terminal Emit outputs an enabling signal (a low level). The fifth thin film transistor M5 and the ninth thin film transistor M9 are switched on under the action of the low-level outputted from the light-emitting control signal terminal Emit. The seventh thin film transistor M7 is switched on under the action of the low-level of the first node N1. The light-emitting device 1 emits light under the action of the driving current. According to the driving current formula, Id=K(PVDD−Vdata+|Vth|−|Vth|)=K (PVDD−Vdata), where K is a constant number and PVDD is a voltage of the power signal terminal PVDD. It can be known that the driving current Id is independent of the threshold voltage of the seventh thin film transistor M7, thereby preventing the threshold voltage drift from adversely affecting the brightness of the light-emitting device 1.

In the non-light-emitting time period t other than the reset time period t1 and the data signal writing time period t2, the first control signal terminal Scan1 outputs a non-enabling level (a high level), the second control signal terminal Scan2 outputs a non-enabling level (a high level), and the light-emitting control signal terminal Emit outputs a non-enable level (a high level). The fifth thin film transistor M5 and the ninth thin film transistor M9 are switched off under the action of the high-level outputted from the light-emitting control signal terminal Emit, so that the power signal terminal PVDD is disconnected from the anode of the light-emitting device 1, thereby controlling the light-emitting device 1 not to emit light.

It should be noted that the pixel driving circuit and the signal timing therein shown in FIG. 8 and FIG. 9 are merely illustrative, and the present disclosure is not limited thereto.

As shown in FIG. 7, the light-emitting scan driving circuit 4 includes a plurality of cascaded shift registers 40, and each shift register includes an input terminal IN and an output terminal OUT. The input terminal IN of each shift register 40 except the first shift register 40 is connected to the output terminal OUT of the previous shift register 40, and the input terminal IN of the first shift register 40 is connected to the initial signal terminal STV of the pixel driving circuit. The output terminal OUT of each shift register 40 is connected to the light-emitting control signal terminal Emit of the pixel driving circuit 3 corresponding to one row of light-emitting devices 1. It should be noted that the structure of the light-emitting scan driving circuit in FIG. 7 is merely illustrative, and the present disclosure is not limited thereto. For example, in other embodiments, each shift register further includes a cascading terminal, except the first shift register, the input terminal of each shift register is not connected to the output terminal of the previous shift register, but is connected to the cascading terminal of the previous shift register.

Figure 10:
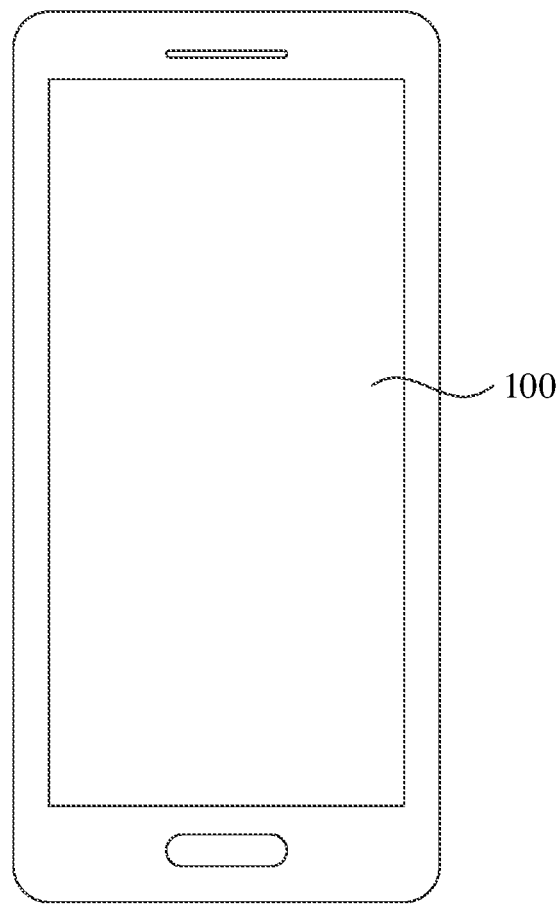
FIG. 10 is a schematic structural diagram of a display device according to an embodiment of the present disclosure.

As shown in FIG. 10, which is a schematic structural diagram of a display device according to an embodiment of the present disclosure, the present disclosure provides a display device, including the display panel 100 described above.

The structure and principle of the display panel 100 are the same as those of the abovementioned embodiments, and will not be further described herein. The display device can be any electronic device having a display function, such as a touch display screen, a cellphone, a tablet computer, a notebook computer, an electronic paper book, a TV, etc.

For the display device in the embodiments of the present disclosure, the light-emitting scan driving circuit outputs the first pulse signal to the corresponding pixel driving circuit during the fingerprint recognition time phase, and the first pulse signal is used to control the light-emitting of the light-emitting device to adapt to the fingerprint recognition function. The light-emitting scan driving circuit outputs the second pulse signal to the corresponding pixel driving circuit during the non-fingerprint recognition time phase. The period of the first pulse signal is different from the period of the second pulse signal. The second pulse signal is used to control the light-emitting of the light-emitting device to adapt to the display function, so as to be compatible with the requirements on the light-emitting device from both the display function and the fingerprint recognition function, thereby improving the fingerprint recognition effect.

The abovementioned embodiments are merely preferred embodiments of the present disclosure and are not intended to limit the present disclosure. Any modifications, equivalent substitutions and improvements made within the principle of the present disclosure shall fall into the protection scope of the present disclosure.

Finally, it should be noted that, the above-described embodiments are merely for illustrating the present disclosure but not intended to provide any limitation. Although the present disclosure has been described in detail with reference to the above-described embodiments, it should be understood by those skilled in the art that, it is still possible to modify the technical solutions described in the above embodiments or to equivalently replace some or all of the technical features therein, but these modifications or replacements do not cause the essence of corresponding technical solutions to depart from the scope of the present disclosure.

What is claimed is:

1. A display panel, comprising:
   a plurality of light-emitting devices;
   a plurality of fingerprint recognition sensors;
   a plurality of pixel driving circuits each corresponding to one of the plurality of light-emitting devices;
   a light-emitting scan driving circuit that controls whether or not the plurality of light-emitting devices emit light; and
   a light-emitting control module, wherein the light-emitting control module comprises: a first thin film transistor having a first terminal connected to the output terminal, a second terminal connected to the first input terminal, and a control terminal; a second thin film transistor having a first terminal connected to the output terminal, a second terminal connected to the second input terminal, and a control terminal; and an inverter having a first terminal connected to the control terminal of the first thin film transistor and a second terminal connected to the control terminal of the second thin film transistor,
   wherein the light-emitting scan driving circuit outputs a first pulse signal to one or more of the plurality of pixel driving circuits during a fingerprint recognition time phase, and outputs a second pulse signal to one or more of plurality of pixel driving circuits during a non-fingerprint recognition time phase, and wherein a period of the first pulse signal is different from a period of the second pulse signal;
   wherein the light-emitting control module is connected to the light-emitting scan driving circuit, and the light-emitting control module is further connected to a fingerprint recognition signal terminal; the light-emitting control module controls, in response to a fingerprint recognition signal from the fingerprint recognition signal terminal, the light-emitting scan driving circuit to output the first pulse signal; and the light-emitting control module further controls, in response to a non-fingerprint recognition signal from the fingerprint recognition signal terminal, the light-emitting scan driving circuit to output the second pulse signal;

wherein the display panel comprises a first pulse signal terminal for outputting the first pulse signal and a second pulse signal terminal for outputting the second pulse signal;

wherein the light-emitting control module comprises a first input terminal, a second input terminal, an output terminal and a strobe control terminal, the first input terminal is connected to the first pulse signal terminal, the second input terminal is connected to the second pulse signal terminal, the output terminal is connected to an initial signal terminal of the light-emitting scan driving circuit, and the strobe control terminal is connected to the fingerprint recognition signal terminal; the light-emitting control module is configured to connect the first input terminal with the output terminal in response to the fingerprint recognition signal from the fingerprint recognition signal terminal, and the light-emitting control module is further configured to connect the second input terminal with the output terminal in response to the non-fingerprint recognition signal from the fingerprint recognition signal terminal;

wherein the strobe control terminal is connected to the first terminal or the second terminal of the inverter; and wherein the first thin film transistor and the second thin film transistor are of a same control type.

2. The display panel according to claim 1, wherein in one frame corresponding to the non-fingerprint recognition time phase, a time period corresponding to the second pulse signal comprises multiple periods of a pulse; and in one frame containing the fingerprint recognition time phase, a time period corresponding to the first pulse signal only comprises one period of a pulse.

3. The display panel according to claim 2, wherein a duty cycle of an enabling level in the first pulse signal is equal to a duty cycle of an enabling level in the second pulse signal.

4. The display panel according to claim 2, wherein a duty cycle of an enabling level in the second pulse signal is a %, a duty cycle of an enabling level in the first pulse signal is b %, and a %<b %<100%.

5. The display panel according to claim 2, further comprising a driving chip connected to each of the plurality of fingerprint recognition sensors, wherein the driving chip is configured to read a fingerprint signal of each of the plurality of fingerprint recognition sensors, and a time at which the driving chip reads the fingerprint signal of each of the plurality fingerprint recognition sensors is within a duration of an enabling level in the second pulse signal.

6. The display panel according to claim 1, wherein the period of the first pulse signal is shorter than the period of the second pulse signal.

7. The display panel according to claim 6, wherein the display panel has a display area the display area comprises a fingerprint recognition region and a non-fingerprint recognition region, and the plurality of fingerprint recognition sensors is located in the fingerprint recognition region; and wherein a duration of each non-enabling level in the first pulse signal is shorter than a scan time for the fingerprint recognition region.

8. The display panel according to claim 1, wherein the plurality of fingerprint recognition sensors comprises an optical fingerprint recognition sensor that is used to receive light emitted from one of the plurality of light-emitting devices.

9. The display panel according to claim 1, wherein the plurality of light-emitting devices comprises an organic light-emitting device.

10. A display device, comprising a display panel, wherein the display panel comprises:
a plurality of light-emitting devices;
a plurality of fingerprint recognition sensors;
a plurality of pixel driving circuits each corresponding to one of the plurality of light-emitting devices;
a light-emitting scan driving circuit that controls whether or not the plurality of light-emitting devices emit light; and
a light-emitting control module, wherein the light-emitting control module comprises: a first thin film transistor having a first terminal connected to the output terminal, a second terminal connected to the first input terminal, and a control terminal; a second thin film transistor having a first terminal connected to the output terminal, a second terminal connected to the second input terminal, and a control terminal; and an inverter having a first terminal connected to the control terminal of the first thin film transistor and a second terminal connected to the control terminal of the second thin film transistor, wherein the light-emitting scan driving circuit outputs a first pulse signal to one or more of the plurality of pixel driving circuits during a fingerprint recognition time phase, and outputs a second pulse signal to one or more of the plurality of pixel driving circuits during a non-fingerprint recognition time phase, and wherein a period of the first pulse signal is different from a period of the second pulse signal;

wherein the light-emitting control module is connected to the light-emitting scan driving circuit, and the light-emitting control module is further connected to a fingerprint recognition signal terminal; the light-emitting control module controls, in response to a fingerprint recognition signal from the fingerprint recognition signal terminal, the light-emitting scan driving circuit to output the first pulse signal; and the light-emitting control module further controls, in response to a non-fingerprint recognition signal from the fingerprint recognition signal terminal, the light-emitting scan driving circuit to output the second pulse signal;

the display panel comprises a first pulse signal terminal for outputting the first pulse signal and a second pulse signal terminal for outputting the second pulse signal;

wherein the light-emitting control module comprises a first input terminal, a second input terminal, an output terminal and a strobe control terminal, the first input terminal is connected to the first pulse signal terminal, the second input terminal is connected to the second pulse signal terminal, the output terminal is connected to an initial signal terminal of the light-emitting scan driving circuit, and the strobe control terminal is connected to the fingerprint recognition signal terminal; the light-emitting control module is configured to connect the first input terminal with the output terminal in response to the fingerprint recognition signal from the fingerprint recognition signal terminal, and the light-emitting control module is further configured to connect the second input terminal with the output terminal in response to the non-fingerprint recognition signal from the fingerprint recognition signal terminal;

wherein the strobe control terminal is connected to the first terminal or the second terminal of the inverter; and wherein the first thin film transistor and the second thin film transistor are of a same control type.

11. The display device according to claim 10, wherein in one frame corresponding to the non-fingerprint recognition time phase, a time period corresponding to the second pulse signal comprises multiple periods of a pulse; and in one frame containing the fingerprint recognition time phase, a time period corresponding to the first pulse signal only comprises one period of a pulse.

12. The display device according to claim 11, further comprising a driving chip connected to each of the plurality of fingerprint recognition sensors, wherein the driving chip is configured to read a fingerprint signal of each of the plurality of fingerprint recognition sensors, and a time at which the driving chip reads the fingerprint signal of each of the plurality fingerprint recognition sensors is within a duration of an enabling level in the second pulse signal.

13. The display device according to claim 10, wherein the period of the first pulse signal is shorter than the period of the second pulse signal.

14. The display device according to claim 13, wherein the display panel has a display area the display area comprises a fingerprint recognition region and a non-fingerprint recognition region, and the plurality of fingerprint recognition sensors is located in the fingerprint recognition region; and wherein a duration of each non-enabling level in the first pulse signal is shorter than a scan time for the fingerprint recognition region.

* * * * *